United States Patent [19]

Beglin

[11] Patent Number: 5,469,560
[45] Date of Patent: Nov. 21, 1995

[54] PRIORITIZING PENDING READ REQUESTS IN AN AUTOMATED STORAGE LIBRARY

[75] Inventor: Thomas W. Beglin, Tucson, Ariz.

[73] Assignee: International Business Machines Corporation, Armonk, N.Y.

[21] Appl. No.: 224,089

[22] Filed: Apr. 5, 1994

Related U.S. Application Data

[63] Continuation of Ser. No. 683,470, Apr. 10, 1991, abandoned.

[51] Int. Cl.⁶ .......................... G06F 13/18; G06F 12/02
[52] U.S. Cl. .................. 395/439; 395/485; 395/600; 364/DIG. 2; 364/952.1; 364/962; 364/963.2; 364/967.4
[58] Field of Search .................. 395/425, 600, 395/439, 485; 364/DIG. 2

[56] References Cited

U.S. PATENT DOCUMENTS

| | | | |
|---|---|---|---|
| 3,623,006 | 11/1971 | Malvern et al. | 395/425 |
| 4,271,489 | 6/1981 | Sirxj et al. | 369/38 |
| 4,527,262 | 7/1985 | Manto | 369/33 |
| 4,614,474 | 9/1986 | Sudo | 414/281 |
| 4,876,662 | 10/1989 | Pence | 395/425 |
| 4,974,197 | 11/1990 | Blount et al. | 364/900 |
| 4,987,533 | 1/1991 | Clark et al. | 395/600 |
| 5,140,683 | 8/1992 | Gallo et al. | 395/425 |
| 5,287,459 | 2/1994 | Gniewek | 395/275 |
| 5,325,523 | 6/1994 | Beglin et al. | 395/600 |

*Primary Examiner*—Eddie P. Chan
*Assistant Examiner*—Reginald G. Bragdon
*Attorney, Agent, or Firm*—F. E. Anderson

[57] ABSTRACT

The average time a user must wait to have an object retrieved from an automated optical disk library is reduced by a method for prioritizing read requests. When a read request is received it is added to a queue of pending requests. All pending requests associated with volumes currently mounted on optical disk drives are processed first. The pending requests associated with the opposite sides of the currently mounted volumes are processed next. The next requests to be processed are those pending read requests associated with the unmounted volume having the greatest number of pending read requests. Thereafter any other pending requests for that unmounted volume will be processed as normally would be done for a currently mounted volume. This method continues until all pending read requests have been processed for the unmounted volumes. Allowing pending requests to go unprocessed, a problem referred to as starvation, is avoided by determining a mean response time of processed requests and increasing the priority of pending requests associated with unmounted volumes having a response time greater than some factor of the mean response time.

19 Claims, 5 Drawing Sheets

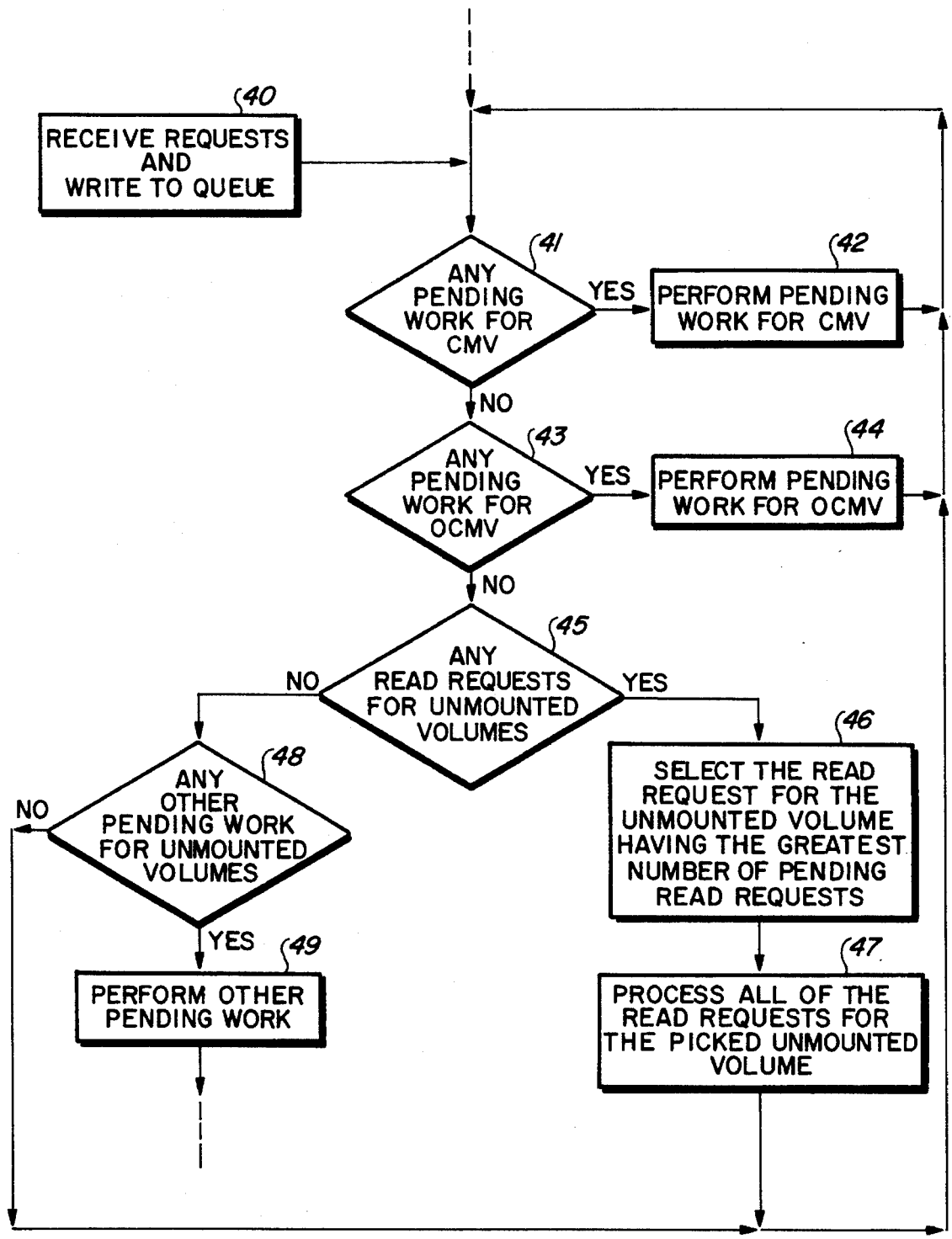

| STEP | DESCRIPTION | DURATION | ELAPSED TIME |
|---|---|---|---|
| 101 | DEMOUNT CURRENTLY MOUNTED VOLUME | 10 | 10 |
| 102 | MOUNT VOL ABC | 10 | 20 |
| 103 | READ OBJECT 1 FROM VOL ABC | 1 | 21 |
| 104 | DEMOUNT VOL ABC | 10 | 31 |
| 105 | MOUNT VOL XYZ | 10 | 41 |
| 106 | READ OBJECT 1 FROM VOL XYZ | 1 | 42 |
| 107 | "      "  2  "      " | 1 | 43 |
| 108 | "      "  3  "      " | 1 | 44 |
| 109 | "      "  4  "      " | 1 | 45 |
| 110 | "      "  5  "      " | 1 | 46 |
| 111 | "      "  6  "      " | 1 | 47 |
| 112 | "      "  7  "      " | 1 | 48 |
| 113 | "      "  8  "      " | 1 | 49 |
| 114 | "      "  9  "      " | 1 | 50 |
| 115 | "      " 10 "      " | 1 | 51 |

FIG. 6A

| STEP | DESCRIPTION | DURATION | ELAPSED TIME |
|---|---|---|---|
| 121 | DEMOUNT CURRENTLY MOUNTED VOLUME | 10 | 10 |
| 122 | MOUNT VOL XYZ | 10 | 20 |
| 123 | READ OBJECT 1 FROM VOL XYZ | 1 | 21 |
| 124 | "      "  2  "      " | 1 | 22 |
| 125 | "      "  3  "      " | 1 | 23 |
| 126 | "      "  4  "      " | 1 | 24 |
| 127 | "      "  5  "      " | 1 | 25 |
| 128 | "      "  6  "      " | 1 | 26 |
| 129 | "      "  7  "      " | 1 | 27 |
| 130 | "      "  8  "      " | 1 | 28 |
| 131 | "      "  9  "      " | 1 | 29 |
| 132 | "      " 10 "      " | 1 | 30 |
| 133 | DEMOUNT VOL XYZ | 10 | 40 |
| 134 | MOUNT VOL ABC | 10 | 50 |
| 135 | READ OBJECT 1 FROM VOL ABC | 1 | 51 |

FIG. 6B

PRIORITIZING PENDING READ REQUESTS IN AN AUTOMATED STORAGE LIBRARY

This is a continuation of U.S. application Ser. No. 07/683,470, Apr. 10, 1991, now abandoned.

FIELD OF THE INVENTION

This invention relates generally to the field of automated storage libraries and more particularly, to a method of reducing the average wait time per user when reading objects from optical disks in an automated optical disk library.

BACKGROUND OF THE INVENTION

Mini and mainframe computers are required to process, and hence store, large amounts of information. Fast processing of information requires that the central processing unit of these computers be able to transfer that information at a high rate of speed. The storage medium used to store information will typically be the limiting factor of the transfer rates.

The fastest storage medium in a computer is main memory which is often referred to as cache memory. This is usually in the form of semiconductor dynamic random access memory (DRAM). While main memory is very fast it is also very expensive relative to other forms of storage media and the amount of main memory that can be economically provided falls far short of the overall storage requirements. Main memory use is thus limited to short term storage of currently active information. The remaining information storage requirements are typically handled by peripheral storage devices.

Peripheral storage devices include magnetic tape storage devices, Direct Access Storage Devices (DASD), and optical storage devices. Each of these storage devices has a substantially greater storage density and lower cost than main memory. However, the time to access information from each of these storage devices is also much greater than the access time of information from main memory. For example, main memory is accessed electronically and no mechanical movement is required. Peripheral storage devices, on the other hand, require that a particular area of tape or disk first be positioned under a read/write head before information accessing can begin.

Some applications must store and retrieve such large amounts of information that many storage devices are required. In these applications the user typically requires a hierarchy of storage that includes some combination of main memory and one or more types of peripheral storage devices. The goal of the hierarchy is to obtain moderately priced high capacity storage while maintaining high speed access to the stored information. Hierarchical storage typically allows information to be transferred between main memory and one or more of the peripheral storage devices or between one or more peripheral storage devices and one or more other peripheral storage devices. Further storage is provided by maintaining libraries of data storage media such as tapes, magnetic disks or optical disks that can be mounted onto the existing peripheral devices. However, additional delays of accessing the information is introduced due to the necessity of having to manually locate and then load, for example, an optical disk onto an optical drive.

Automated storage libraries improve the access time to information stored on a tape, magnetic disk, or optical disk contained therein by automatically managing the storage of such tapes and disks. Automated storage libraries include a plurality of storage cells for storing library-resident data storage media, a robotic picker mechanism, and one or more internal peripheral storage devices. Each data storage medium may be contained in a cassette or cartridge housing for easier handling by the picker. The picker operates on command to transfer a data storage medium between a storage cell and an internal peripheral storage device within seconds. A significant improvement in access time to the desired information is provided since the picker mechanism operates much faster than manual transfers of storage media. Still more storage may be provided by including an external shelf for storing additional data storage media which may be manually inserted into the automated storage library.

The improved response time provided by automated storage libraries has made it feasible to store a large number of images as a data type for computer processing. Such images include engineering drawings, financial and insurance documents, medical charts and records, voice data, etc. These images are known as objects in order to identify them as data elements having an unconventional data structure. Text, a conventional data structure, is encoded on a storage medium in streams of binary 1's and 0's of fixed lengths.

An object, on the other hand, is a named stream of binary 1's and 0's of a known length which may or may not be encoded. The length of the stream of bits is not fixed but may vary from a few bytes to several megabytes.

Optical disks provide the highest density of the storage media and hence an automated optical library is most suitable for storing large object databases. Examples of optical disk libraries are given in U.S. Pat. Nos. 4,271,489, 4,527,262 and 4,614,474. Each optical disk in an optical library may consist of two logical volumes so that there is one volume per side. To access objects on a given volume, the disk containing that volume is retrieved from the library by the picker and mounted onto an internal optical drive. This may require that a presently mounted disk first be demounted and stored in the library by the picker.

Hundreds of millions of objects can be stored in an automated optical disk library. Efficient management is a necessity given the large number of objects handled. Object management software provides that management. Object Access Method software (OAM), a subcomponent of an IBM program product Multiple Virtual Storage/Data Facility Product software, (MVS/DFP), is object management software for managing the hundreds of millions of objects. OAM keeps an inventory of each object including its location information in an OAM object directory. Library Control System (LCS) is a subcomponent of OAM for processing a variety of requests affecting the optical disks. Processing the requests requires that the corresponding volume be mounted on an optical drive. If that volume is library-resident the picker automatically moves the optical disk cartridge from the storage area to an optical drive. If the volume is shelf-resident, then mounting is accomplished with human intervention. In cases of shelf-resident volumes, LCS issues a message to an operator regarding the shelf location and the optical drive designated to receive the volume.

LCS performs volume requests which are those requests that affect a volume as a whole. Volume requests include the requests for auditing or defragmenting a volume. A volume is audited by retrieving and mounting that volume for the purpose of verifying that the optical disk cartridge containing the volume is actually present within the library. Defragmenting a volume entails moving data recorded on a volume in order to reduce the number of free extents thereby increasing the size of the free extents. Each free extent consists of one or more adjacent sectors wherein no two free extents are contiguous. Increasing the size of the free extents increases the probability that a file will be able to occupy a single contiguous area. This in turn reduces the time required to read such a file since seek operations to different physical areas of the surface of the volume is not required when sequentially reading a file. Normally there will be relatively few volume requests pending for a given volume.

LCS also performs object requests which are requests to perform an operation on an object. Object requests include requests to read, write, or delete an object from a volume.

Write requests further include specific and nonspecific write requests. A specific write request identifies a specific volume to be written to. A nonspecific write request only identifies a storage group from which a volume may be chosen according to a LCS volume selection algorithm. A storage group is a collection of optical disk volumes having some specified attributes in common. Volume selection is determined by choosing the volume having the least amount of available space yet capable of accommodating the object or objects to be written.

In an IBM MVS/ESA IMAGEPLUS software environment, each object stored by LCS on optical disk volumes contains compressed image data representing an electronically scanned document consisting of one or more pages. A user request to display a document causes LCS to read the appropriate object from an optical disk volume (the object might reside in DASD or main memory in which instance it would be read therefrom). Typically, there are hundreds or thousands of interactive users at individual IMAGEPLUS workstations wherein document requests may be issued. As a result, a large number of read requests may be pending in LCS to read objects from a large number of the optical disk volumes. These optical disk volumes may be currently mounted in an optical disk drive or may be currently stored in the storage cells of an automated storage library.

Due to the large number of requests that may be queued up in an automated library it is necessary to manage the queued requests efficiently. The manner in which the queued requests are executed has a significant impact on the efficiency of information access. Efficiency can be improved by prioritizing requests according to predetermined attributes, for example, according to the information presently stored in main memory, on a first-in first-out basis, or according to the volumes already mounted in the peripheral devices. These prioritization techniques are described in commonly assigned Patent Application 07/317,493 filed Mar. 1, 1989, now U.S. Pat. No. 5,140,683 issued Aug. 18, 1992. Blount, et al., in U.S. Pat. No. 4,974,197 describe a method of improving the efficiency of writing a Volume Table of Contents (VTOC) and the associated objects to an optical disk by collecting a given number of predetermined objects such that a single access writes the objects and the corresponding VTOC entry.

Mounting a volume, even if done by the robotic picker, is very slow relative to the seek time of an object plus the writing, reading or deleting time of even large objects. Performing many mounts, therefore, substantially slows the servicing of the pending requests. The efficiency of an automated library could be improved by reducing the number of mounts for a given number of volume and object requests. Furthermore, if many users are waiting for their read requests to be processed, the order in which the requests are processed can substantially affect the average time each user must wait. For example, if many volumes are mounted which each have only one pending read request processed followed by the mounting of volumes having many pending read requests, the intervening mounting and demounting times of the volumes increases the average time that all users must wait for their requests to be serviced.

Thus, what is needed is an automated optical disk library that provides a method of prioritizing the order in which read requests are processed for reducing the average time a user waits when reading objects from optical disk volumes contained within the automated storage hierarchy.

SUMMARY OF THE INVENTION

Accordingly, it is an object of the present invention to provide an improved method of reading objects from disks in an automated storage library.

Another object of the present invention is to provide a method of ensuring that all read requests are performed within a maximum predetermined time.

Yet another object of the present invention is to reduce the average response time per read request in an automated storage library.

Still another object of the present invention is to provide a method of reducing the number of mounts necessary to service a given number of requests in an automated storage library.

These and other objects of this invention are accomplished in an information processing system having a prioritized method of reading objects from given volumes. This method includes receiving read requests and writing those read requests to a queue. All pending work requests queued for a volume currently mounted are processed followed by the processing of the queued requests for the opposite side of that currently mounted volume. Thereafter an unmounted volume having the greatest number of pending read requests is selected. The selected unmounted volume is mounted so that the selected unmounted volume becomes a currently mounted volume. The information processing system next processes all of the pending read requests for the now currently mounted volume. Processing all of the pending read requests for the opposite side of the currently mounted volume is accomplished before selecting another unmounted volume. Starvation of processing information is avoided by increasing a priority of each unmounted volume having a read response time that exceeds an average response time to a priority equal to that of the currently mounted volume. By mounting the unmounted volume having the greatest number of read requests the average time a user has to wait for processing of those requests is reduced.

The foregoing and other objects, features and advantages of the invention will be apparent from the following more particular description of the preferred embodiment of the invention, as illustrated in the accompanying drawing.

BRIEF DESCRIPTION OF THE DRAWING

FIG. 5 is a flow diagram of a task which is part of a method of reading objects in an automated optical disk library of the present invention.

FIG. 6A is a table representation of a sequences of events followed for reading objects from volumes.

FIG. 6B is a table representation of a sequence of events followed for reading objects from volumes according to the present invention.

DESCRIPTION OF THE PREFERRED EMBODIMENT

Figure 2:
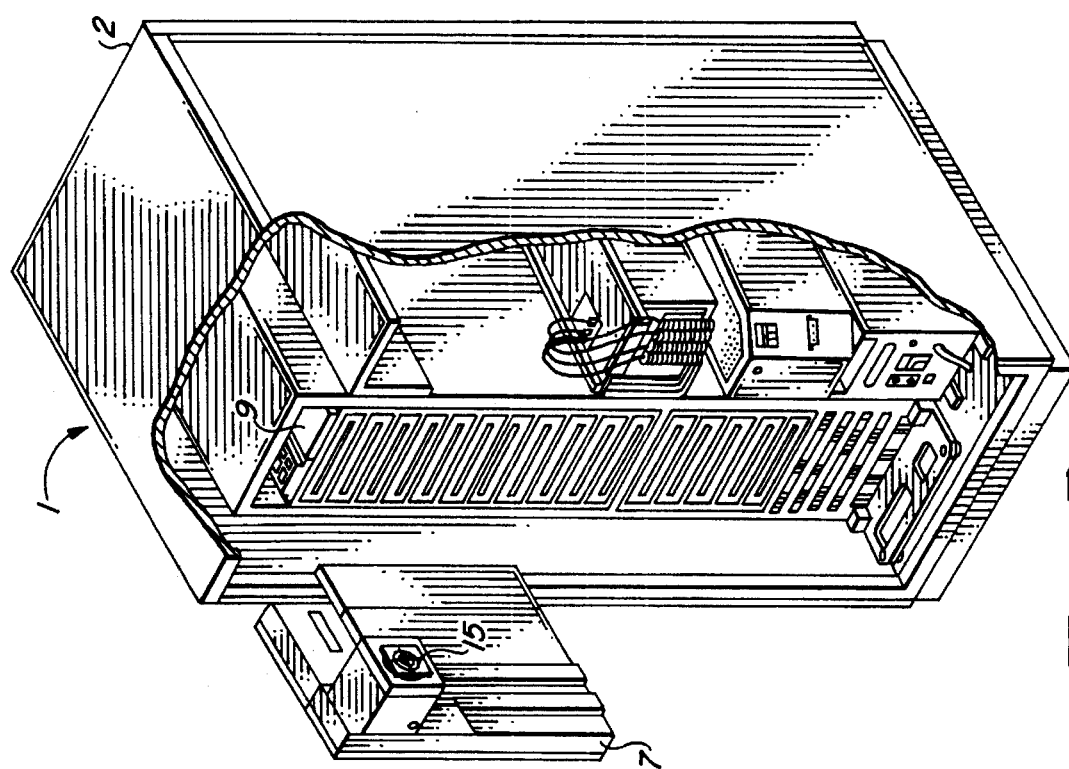
FIG. 2 is the same view as in FIG. 1 except that a console panel has been swung aside and a fan has been removed.
Figure 1:
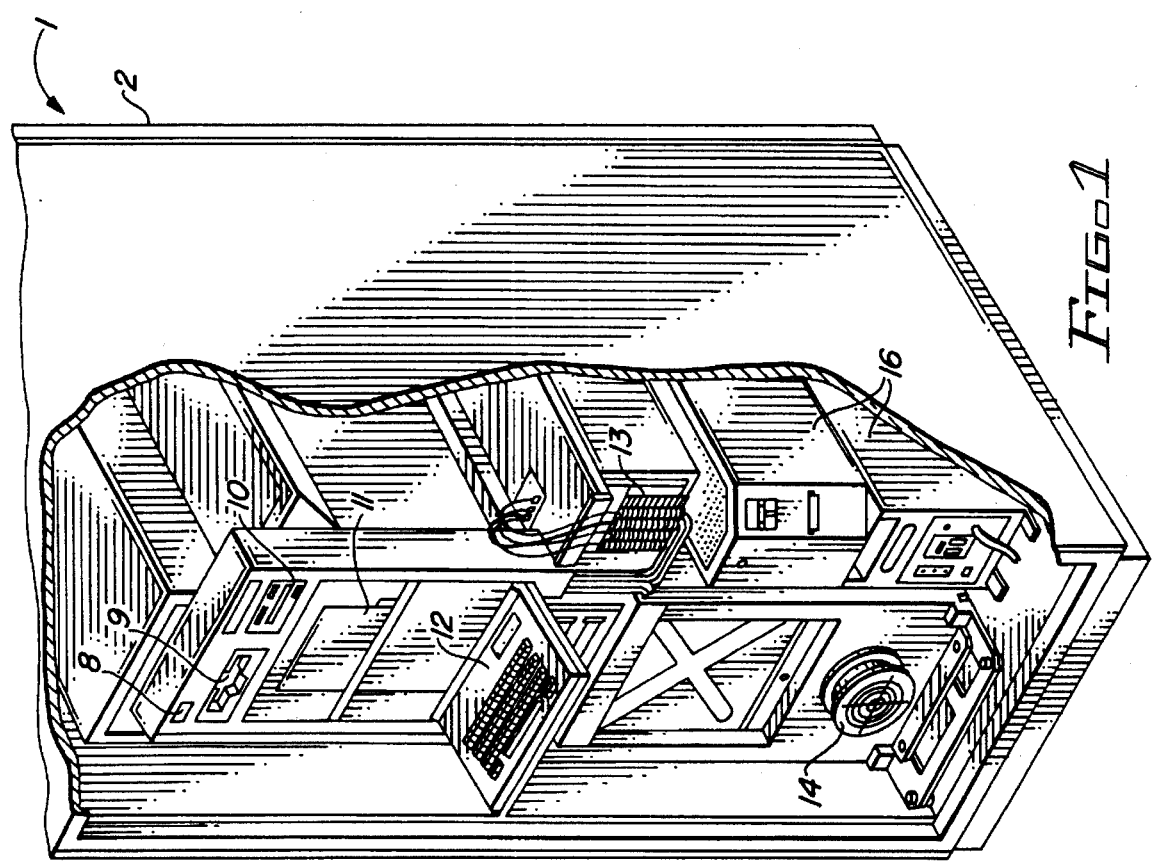
FIG. 1 is a front, perspective cut-away view of an automated optical disk library.
Figure 3:
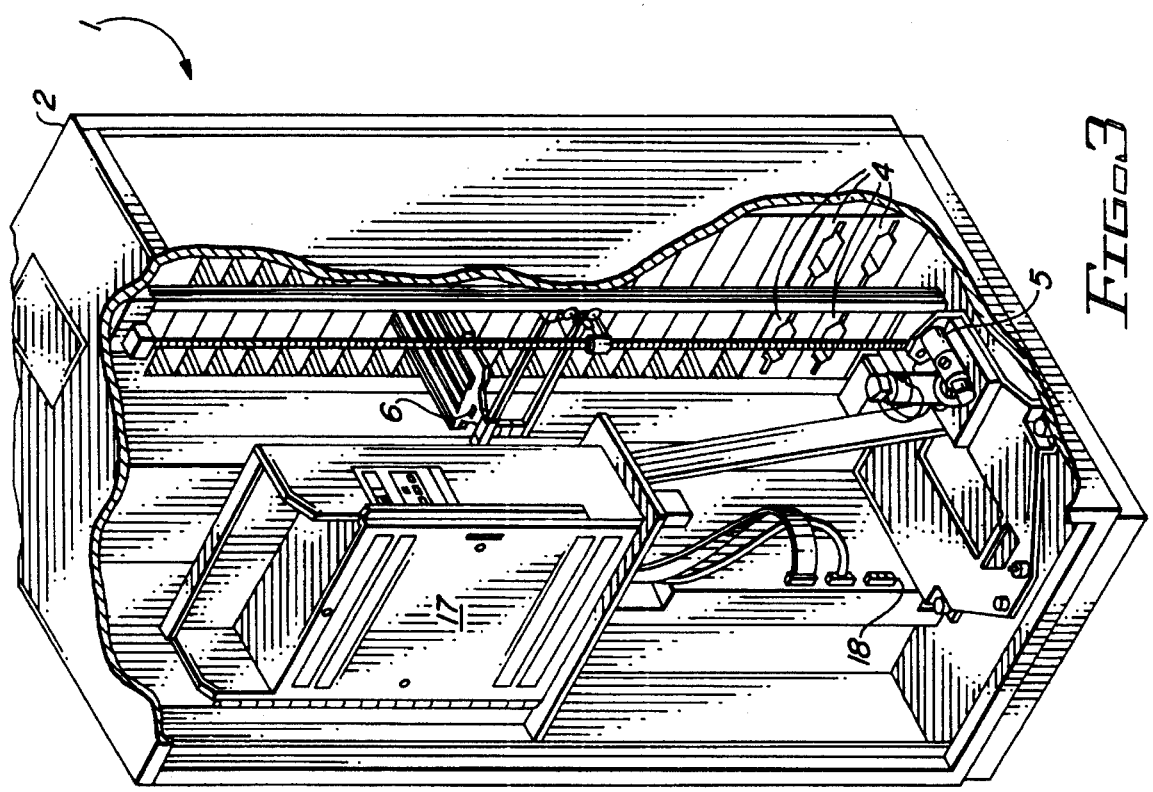
FIG. 3 is a rear perspective cut-away view of the automated optical disk library of FIGS. 1 and 2.

Referring now more particularly to the drawing, like numerals denote like features and structural elements in the various figures. Referring to FIGS. 1–3, various views of an automated optical disk library 1 are shown. The library 1 includes a housing 2 enclosing most of the working parts of the library 1 and having front and rear door panels (not shown) for interior access. Library 1 also includes a plurality of optical disk storage cells 3 and a plurality of internal optical disk drives 4. Each storage cell 3 is capable of storing one optical disk having data recorded on one or both sides thereof. The data stored on each side of a disk is referred to as a volume so that there are two volumes per disk. Automated optical disk library 1 includes 144 storage cells 3 arranged in two 72 storage cell columns and up to four internal optical disk drives 4.

A robotic picker 5 includes a single gripper 6 capable of accessing an optical disk in any of the storage cells 3 or optical disk drives 4 and transferring such optical disks therebetween. The optical disks are configured in cartridges for easy handling by the gripper 6 and are 5¼ inch form factor disks, but alternative embodiments could be any size compatible with the optical disk drives 4 and the gripper 6.

Although the front face of the housing 2 is not shown in FIG. 1, certain portions of the automated optical disk library 1 protrude through such front face of the housing 2 for operator access. These portions are part of a console door 7 and include all or part of a power indicator/switch 8, an entry/exit slot 9, an external optical disk drive 10, a console 11, and a keyboard 12. The console door 7 can be swung aside to allow access therebehind. The entry/exit slot 9 is used for inserting optical disks to or removing optical disks from the automated optical disk library 1. Commands may be provided by an operator to the automated optical disk library 1, via the keyboard 12, to have the picker 5 receive an optical disk inserted at the slot 9 and transport such optical disk to a storage cell 3 or optical disk drive 4 and deliver such optical disk to the slot 9 for removal from the library 1. Console 11 allows an operator to monitor and control certain operations of the library 1 without seeing inside the housing 2. External optical disk drive 10 cannot be accessed by the gripper 6 but must be loaded and unloaded manually. The library 1 also includes an optical disk drive exhaust fan 14, an external disk drive exhaust fan 15, and power supplies 16.

Once the library 1 is powered on, commands received at the keyboard 12 are forwarded to a system controller 17. In the preferred embodiment, the system controller 17 is an IBM PS/2 Model 80 personal computer using the OS/2 operating system. The system controller 17 includes main memory and one or more storage media, such as those in fixed or floppy disk drives. The system controller 17 issues instructions to the optical disk drives 4, the external optical disk drive 10, and the picker 5. Drive controller cards 13 and picker 5 controller card 18 convert known small computer system interface (SCSI) command packets issued by the system controller 17 into electromechanical action of the drives 4, the external drive 10, and the picker 5.

Figure 4:
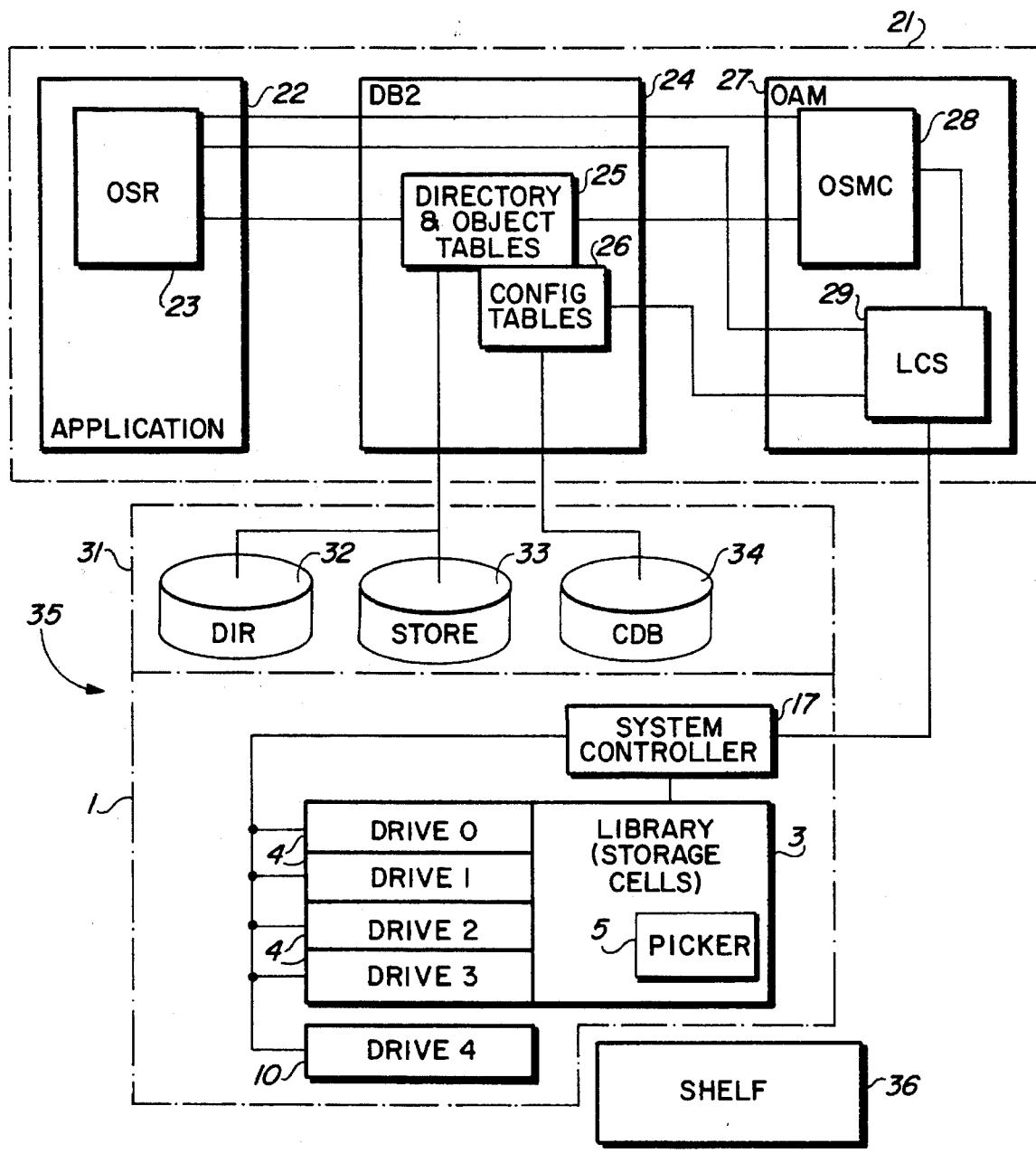
FIG. 4 is a block diagram of an object storage hierarchy utilizing Object Access Method to manage objects in an automated optical disk library.

Referring now to FIG. 4, a block diagram of an object storage hierarchy 35 is shown which includes a management and first level storage 21, a second level storage 31 and the automated storage library 1 providing a third level of storage. A fourth level of storage is provided by a shelf 36. The shelf 36 stores optical disk volumes which are manually loaded into the automated storage library 1 via the external optical disk drive 10. The management and first level storage 21 further includes an application interface 22 a DB2 (database) 24 and an OAM 27. Application interface 22 is typically a workstation server which has the capability of sending and receiving scanned documents (objects) and interfacing to DB2 24 and OAM 27 via Object Storage and Retrieval (OSR) 23.

OSR 23 provides an application program interface for storing, retrieving, and deleting individual objects. OSR 23 also maintains information about objects in DB2 24 including object name, size, location, creation date, last reference date, etc. DB2 24 and OAM 27 is stored on a mainframe computer (not shown) as part of MVS/DFP operating system wherein the mainframe computer includes main memory as the first level of storage in the object storage hierarchy 35. DB2 24 includes directory and object tables 25 and configuration tables 26 which are connected to OSR 23 for storing object information thereon. OAM 27 includes OAM Storage Management Component (OSMC) 28 and Library Control System (LCS) 29. OSMC 28 is connected to the LCS 29, to the OSR 23, and to the directory and objects tables 25. The function of the OSMC 28 is to manage an inventory of hundreds of millions of objects within an object storage hierarchy based on a specified storage management policy. OSMC 28 management includes determining where objects are to be stored, moving objects within an object storage hierarchy, managing object backup, and determining object expiration. LCS 29 is connected to the OSR 23, the configuration tables 26, and to the system controller 17 of the automated optical disk library 1. LCS 29 reads and writes objects to optical disks, manages volumes storing those objects, and instructs the system controller 17.

The second level storage 31 includes DASDs DIR 32, STORE 33, and Configuration Database (CDB) 34. The DIR 32 stores directory information of stored objects, the STORE 33 stores objects, and the CDB 34 stores a deleted objects table and a volume table. The deleted objects table receives requests for objects to be deleted from specified volumes. The volume table indicates the amount of free space and the number of objects to be deleted from each volume. CDB 34 is connected to the configuration tables 26, and DIR 32 and Store 33 are connected to the directory and object tables 25. The third level of storage includes the automated optical disk library 1 having the system controller 17 connected to the storage cell 3, the optical disk drives 4 consisting of drives 0–3, and to the external optical disk drive 10. The fourth level of storage is provided by the shelf 36 which is interfaced to the automated optical disk library 1 by an operator transferring optical disks therebetween.

Requests received by the LCS 29 are not processed in a first-in first-out basis. Instead the LCS 29 uses a dispatching algorithm for prioritizing requests. Top priority is assigned to requests that can be processed by accessing a currently mounted volume (CMV). The next level of priority is assigned to those requests that can be processed by access to the opposite side of the CMV (OCMV). The lowest level of priority is assigned to those requests that require the mounting of an unmounted volume. Volumes stored on the shelf 36 may not have some requests serviced unless one of those volumes have been mounted on the external optical disk drive 10.

Processing requests for CMVs require the least amount of time and therefore those requests are given top priority. Requests to process objects stored on the opposite side of a CMV requires that the media be spun down, removed from an optical disk drive 4, flipped over and re-inserted into the optical disk drive 4, and spun back up to full rotational speed. The time required to accomplish this, as long as ten seconds, is much longer than the time required to access an object on a CMV. Processing requests for unmounted volumes requires the most amount of time. Mounting an unmounted volume requires that the robotic picker 5 move a volume from the storage cell 3 to an optical disk drive 4 and then spinning the volume up to the required rotational speed. Mounting an unmounted volume can take up to twenty seconds. Still more time is needed if a CMV must first be demounted and stored before mounting the unmounted volume.

Referring now to FIG. 5 a flow diagram of a task for managing object and volume requests is shown. In step 40 object and volume requests are received in the LCS 29. When the LCS 29 receives a read request an entry is made in a request queue indicating which volume the object to be read is stored on. Step 41 is a decision step for determining whether there are any pending requests for the CMV. If there are pending requests for the CMV then control is transferred to step 42 where those pending requests are processed. If there are no pending requests found for the CMV in step 41 or if the pending requests have been processed in step 42 then another decision step is performed at step 43, that is, determining whether there are any pending requests for the OCMV. If there are pending requests for the OCMV then step 44 spins down the disk in the optical disk drive 4, flips the disk, and re-mounts the disk so that the OCMV is now the CMV and the pending requests for that volume are processed.

After all of the pending requests of the OCMV have been processed step 45 determines whether there are any pending read requests for unmounted volumes. When there are pending read requests for more than one unmounted volume, the unmounted volume having the greatest number of read requests will be selected for mounting in step 46. When the selected unmounted volume is mounted the pending read requests for that volume are processed in step 47. After all of the pending read requests are processed for the selected volume in step 47 control returns to step 41. At this time the pending delete requests are processed for the selected volume since it is now the CMV and has the highest priority, and finally any pending write requests for the selected volume are processed. After all of the pending requests for the selected volume have been processed the pending requests for the opposite side of the selected volume will be processed in steps 43 and 44 as described above.

Steps 41–47 are repeated until all pending read requests have been processed for both mounted and unmounted volumes. Thereafter control transfers to step 48 for determining whether there are any other pending requests for unmounted volumes. These other pending requests are then processed in step 49. Picking read requests associated with the unmounted volume with the greatest number of pending read requests can improve read response time, reduce the number of required volume mounts, and enhance hardware lifetime of the automated optical disk library 1 by reducing the mechanical activity therein.

Referring to FIGS. 6A and 6B, an example illustrating how a performance improvement is achieved by the present invention is shown. The worst case scenario results from processing read requests strictly on a first-in first-out basis, that is, processing each read request as it came into the queue. This would result in processing a read request on a first volume, demounting that volume which might still have other pending read requests in order to process the next read request in the queue which may require a different volume be mounted. An improved method of processing read requests, as represented by steps 101–115 in table 38 in FIG. 6A, is to process the first read request encountered in the queue and then processing the remaining read requests for that volume regardless of their order in the queue. A further improvement, according to the present invention, is represented by steps 121–135 in table 39 of FIG. 6B wherein a volume XYZ having the greatest number of pending read requests is mounted for processing first.

The following assumptions are made for reading objects from volumes ABC and XYZ: 10 seconds are required to demount a volume; 10 seconds are required to mount a volume; only one optical disk drive 4 is available (all other drives are busy); one second is required to read an object 64K bytes in length; no other pending requests exists for the CMV or the OCMV; only one pending read request exists for an object residing on the volume ABC; and 10 pending read requests exist for objects residing on the volume XYZ. The method depicted by steps 101–115 include demounting a CMV, mounting the volume ABC, reading an object therefrom, demounting the volume ABC, mounting the volume XYZ and reading 10 objects therefrom. The total elapsed time is 51 seconds. The average time a user must wait to access an object is found by summing the elapsed times of steps 103 and 106–115 (the read object steps) divided by the number of objects read:

Average time elapsed per read =486 seconds/11 reads =44.1 seconds per read.

The method of the present invention as depicted by the steps 121–135 of table 39 include demounting a CMV, mounting the volume XYZ and reading 10 objects therefrom, demounting the volume XYZ, mounting the volume ABC and reading an object therefrom. The total elapsed time to read the 11 objects is 51 seconds which is the same time required to read as the objects in the steps 101–115. However, the average time a user must wait to access an object (summing steps 123–132 and 135) has been reduced to:

Average time elapsed per read =306 seconds/11 reads =27.8 seconds per read.

Therefore, by prioritizing the pending read requests so that volumes having the greatest number will be processed first, the average time a user must wait to read each object can be reduced. The times given above are by way of example only as the number of pending reads in a typical application would be far greater.

Figure 7:
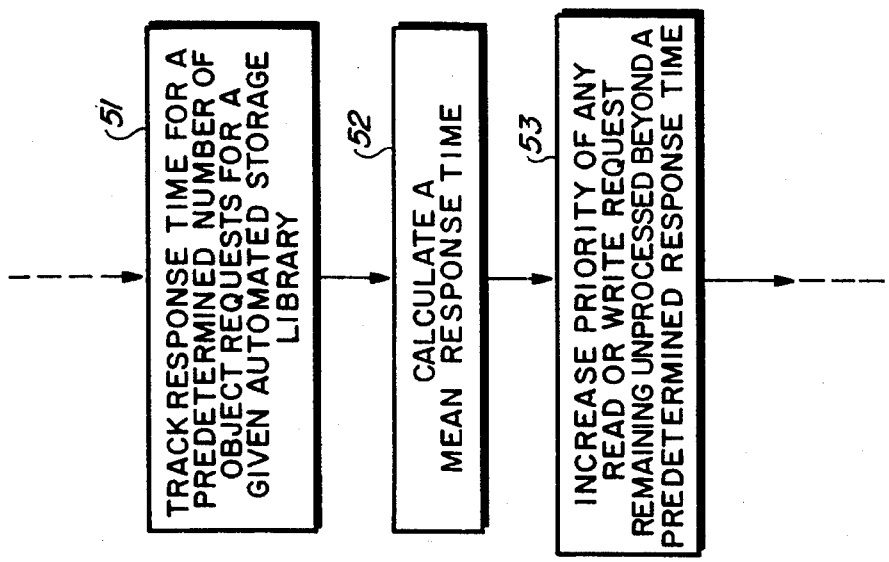
FIG. 7 is a flow diagram of a routine for preventing starvation of requests in the present invention.

The method according to the present invention gives priority to a CMV, an OCMV, or to an unmounted volume having the greatest number of pending requests. As a result, an unmounted volume having only a few pending read requests may never get mounted if requests are continually received for mounted volumes or other unmounted volumes continue to have more pending read requests. This potential problem is known as starvation. Steps 51–53 of FIG. 7 provide a method for preventing starvation. In step 51 the response time for a predetermined number of processed requests for a given automated optical disk library 1, for example, the last 256 processed requests, is tracked. The most recent 256 such requests would typically represent the approximately 60 minutes of activity in an automated library continuously mounting optical disk volumes. A mean response time is next calculated in step 52. The mean response time is a function of the average response time of some predetermined number of processed requests. Any requests requiring an unmounted optical disk volume that remain unprocessed for some multiple of the mean response time (i.e., two times the mean response time) will have its priority increased in step 53. The priority could be increased, for example, to the priority of a request requiring a CMV. As a result, a pending request for an unmounted volume will not remain unprocessed indefinitely.

While the invention has been particularly described with reference to particular embodiments thereof, it will be understood by those skilled in the art that various other changes in detail may be made therein without departing from the spirit, scope, and teaching of the invention. For example, the preferred embodiment describes an automated optical disk library but one skilled in the art would readily realize the application of the invention to other automated libraries. Furthermore, while the next unmounted volume chosen for mounting is based on the relative number of pending read requests, it is possible to use other criteria, i.e., write requests, deletes, defrag, etc. Also, choosing a time period for updating the priority of unprocessed read requests can be based on numerous alternative criteria.

What is claimed is:

1. In an information processing system, a method of processing object and volume requests, and more specifically, reading objects from one or more volumes contained on a data storage media for minimizing an average response time for each user, said method comprising the steps of:

receiving read requests;

selecting an unmounted volume having a greatest number of pending read requests compared to a number of pending read requests of each volume of said other one or more volumes;

mounting the selected unmounted volume so that the selected unmounted volume becomes a currently mounted volume;

processing all of the pending read requests for the currently mounted volume; and processing all of the pending read requests for an opposite side of the currently mounted volume before selecting another unmounted volume, whereby the average response time is minimized.

2. The method according to claim 1 further comprising the step of writing received read requests to a queue after requests.

3. The method according to claim 2 further comprising the step of executing all object and volume requests for the currently mounted volume before processing the pending read requests for the opposite side of the currently mounted volume.

4. The method according to claim 3 further comprising the step of increasing a priority of a pending read request associated with an unmounted volume having a read response time at least as long as a predetermined time so that the priority of said pending read request is greater than other pending read requests respectively associated with other unmounted volumes.

5. The method according to claim 5 wherein the predetermined time is a function of an average response time for a predetermined number of read requests.

6. A computer process for processing object and volume requests, including reading objects from one or more volumes in an automated storage library wherein read requests are queued but said objects are not physically read until a queued read request associated with an object has the highest priority among said read requests for reducing an average read response time, said automated storage library including said one or more volumes for storing the objects, the computer process comprising the steps of:

processing all pending read requests for a first currently mounted volume;

processing all pending read requests for an opposite side of the first currently mounted volume;

selecting an unmounted volume having a greatest number of pending read requests compared to a number of pending read requests of each of other said one or more volumes;

mounting the selected unmounted volume so that the selected unmounted volume becomes a second currently mounted volume;

processing all of the pending read requests for the second currently mounted volume;

processing all of the pending read requests for an opposite side of the second currently mounted volume before selecting another unmounted volume, thereby reducing the average read response time; and increasing a priority of a pending read request associated with an unmounted volume having a read response time at least as long as a predetermined time so that the priority of said pending read request associated with the unmounted volume is greater than other pending read requests respectively associated with other unmounted volumes.

7. The computer process according to claim 6 further comprising the step of executing all object and volume requests for the selected unmounted volume after it has been mounted and before processing the pending read requests for the opposite side of the selected unmounted volume.

8. The computer process according to claim 7 wherein the predetermined time is a function of an average response time for a predetermined number of read requests.

9. The computer process according to claim 8 wherein the priority of the pending read request of the unmounted volume, once increased, is equal to a priority of the pending read requests of the selected unmounted volume after it has been mounted.

10. A hierarchical storage system having a plurality of storage levels for storing and managing objects, said hierarchical storage system comprising:

an automated storage library having a plurality of volumes for storing objects thereon, a first drive for mounting one of the plurality of volumes therein, a controller for providing commands to said first drive; and storage means coupled to said automated storage library for causing read requests received by said hierarchical storage system to be written into groups of pending read requests, each group of pending read requests associated with a volume having the objects of those read requests stored thereon, said storage means commanding said automated storage library to select an unmounted volume which has a greatest number of pending read requests as compared to a number of pending read requests of each volume of other volumes of said plurality of volumes to become a currently mounted volume when said first drive is available for minimizing an average response time.

11. The hierarchical storage system according to claim 10 wherein said groups of pending read requests are stored in an object table database in one of said plurality of storage levels.

12. The hierarchical storage system according to claim 11 further comprising a second drive for receiving unmounted volumes from an operator.

13. The hierarchical storage system according to claim 12 wherein said storage means further comprises:

a library control system; and an object storage and management component.

14. A hierarchical storage system having a plurality of levels of storage for managing objects therein, one level of storage being an automated library having a plurality of volumes for storing objects thereon, said hierarchical storage system comprising:

storage means for storing an object management component;

a control unit coupled to said storage means for receiving commands therefrom;

optical storage and retrieval means coupled to said storage means for receiving volume and object requests, wherein volume requests include defragment and reclamation requests and object requests include read, write, and delete requests;

object table means coupled to said storage means for storing read requests into pluralities of pending reads, each one of the plurality of pending reads grouped according to a volume the objects to be read are stored on, said object management component prioritizing volume and object request processing and selecting an unmounted volume having a greatest number of pending reads, compared to a number of pending reads for each unmounted volume, to become a next currently mounted volume; and a first drive coupled to said control unit for receiving the selected unmounted volume after executing all pending reads for a volume currently mounted thereon and executing the pending reads for the selected unmounted volume.

15. The hierarchical storage system according to claim 14 further comprising a second drive for receiving unmounted volumes from an operator.

16. The hierarchical storage system according to claim 15 further comprising a shelf for storing said unmounted volumes.

17. The hierarchical storage system according to claim 16 wherein said object management component comprises:

a library control system; and an object storage and management component.

18. A program product for use in a hierarchical storage system including an automated storage library having a plurality of volumes for storing objects thereon, the program product managing object requests for the automated storage library, the program product comprising:

means for receiving the object requests; and library control means coupled to the receiving means for writing the object requests to a queue of pending object requests and processing the pending object requests in a prioritized order such that the pending object requests for a currently mounted volume have a highest priority, pending object requests for an opposite side of the currently mounted volume have an intermediate priority, and pending object requests for unmounted volumes have a lower priority, the library control means further comprising:

selection means for selecting an unmounted volume having a greatest number of pending object requests, as compared to a number of pending object requests for each unmounted volume of said unmounted volumes, and increasing a priority of one of a greatest number of pending object requests to the highest priority such that the selected unmounted volume will become a next currently mounted volume; and processing means for instructing a mounting and processing of the pending object requests for the selected unmounted volume.

19. The program product according to claim 18 further comprising starvation means coupled to the library control means for increasing a priority of pending object requests associated with an unselected unmounted volume having remained unprocessed for a predetermined length of time.

* * * * *

UNITED STATES PATENT AND TRADEMARK OFFICE
CERTIFICATE OF CORRECTION

PATENT NO. : 5,469,560
DATED : November 21, 1995
INVENTOR(S) : Thomas W. BEGLIN

It is certified that error appears in the above-indentified patent and that said Letters Patent is hereby corrected as shown below:

Column 9    Line 52 before 'requests'  insert

--receiving said read

Signed and Sealed this

Twenty-third Day of April, 1996

Attest:

BRUCE LEHMAN

*Attesting Officer*    Commissioner of Patents and Trademarks